(12) United States Patent
Adams et al.

(10) Patent No.: US 7,734,058 B1
(45) Date of Patent: Jun. 8, 2010

(54) IDENTIFYING, GENERATING, AND STORING CROPPING INFORMATION FOR MULTIPLE CROPS OF A DIGITAL IMAGE

(75) Inventors: Cheryl Adams, Cary, NC (US); Patricia Scardino, Apex, NC (US)

(73) Assignee: Qurio Holding, Inc., Raleigh, NC (US)

( * ) Notice: Subject to any disclaimer, the term of this patent is extended or adjusted under 35 U.S.C. 154(b) by 897 days.

(21) Appl. No.: 11/210,334

(22) Filed: Aug. 24, 2005

(51) Int. Cl.
*G06K 9/00* (2006.01)
(52) U.S. Cl. ..................................... 382/100
(58) Field of Classification Search ................ 382/173, 382/282, 283, 100, 276; 345/620–628; 358/453–455
See application file for complete search history.

(56) References Cited

U.S. PATENT DOCUMENTS

| | | | |
|---|---|---|---|
| 6,587,596 B1 * | 7/2003 | Haeberli | 382/283 |
| 7,142,225 B1 * | 11/2006 | Boler et al. | 345/619 |
| 2001/0046330 A1 | 11/2001 | Shaffer et al. | |
| 2003/0058254 A1 | 3/2003 | Dworsky et al. | |
| 2003/0058354 A1 | 3/2003 | Parulski et al. | 348/231.6 |
| 2004/0091256 A1 | 5/2004 | Brost | 396/380 |
| 2004/0091257 A1 | 5/2004 | Brost | 396/380 |
| 2004/0212695 A1 | 10/2004 | Stavely et al. | 348/231.3 |
| 2004/0257380 A1 | 12/2004 | Herbert et al. | 345/619 |
| 2005/0271864 A1 | 12/2005 | van Driesten et al. | |
| 2006/0177132 A1 * | 8/2006 | Jackson et al. | 382/173 |

* cited by examiner

*Primary Examiner*—Samir A Ahmed
*Assistant Examiner*—Atiba O Fitzpatrick
(74) *Attorney, Agent, or Firm*—Withrow & Terronova, PLLC

(57) ABSTRACT

A system and method are provided that allow multiple crops to be defined for a single digital image without altering the digital image. Rather than actually cropping the digital image where a portion of the digital image is lost, the present invention generates and stores cropping information defining a desired area of the digital image for each of the crops. The cropping information is stored in metadata associated with the digital image or in an associated application file.

20 Claims, 4 Drawing Sheets

IDENTIFYING, GENERATING, AND STORING CROPPING INFORMATION FOR MULTIPLE CROPS OF A DIGITAL IMAGE

FIELD OF THE INVENTION

The present invention relates to cropping digital images and more particularly to storing information defining multiple crops of a digital image.

BACKGROUND OF THE INVENTION

Digital cameras have become prolific in today's world. Digital cameras allow a user to take tens or hundreds of pictures and then transfer the digital pictures from the camera to the user's computer, a printer, a photoediting and printing kiosk, or the like. The digital pictures can then be printed, e-mailed to family and friends, shared with family and friends using photosharing software such as QURIO® peer-to-peer photosharing software, and/or printed onto various products such as mugs, mouse pads, t-shirts, posters, and the like. QURIO® peer-to-peer photosharing software is produced by Qurio Holdings, Inc., 20 Depot Street, Suite 2A, Petersborough, N.H. 03458. In addition, the user may perform various photoediting steps such as red-eye reduction and cropping using photoediting software.

There are two basic problems associated with cropping digital images using traditional photoediting software. One of these problems is that the portion of the digital picture that is removed by cropping is discarded. In order to prevent the portion of the digital picture from being lost, a user must save both the original image and the cropped image. As a result, the user saves multiple versions of the same image, thereby wasting disk space. The second problem is that if the user desires to perform further photoediting tasks such as red-eye reduction or adjusting the contrast of the digital picture after cropping a digital image, the user must edit both the original digital image and any cropped versions of the digital image if consistency is desired.

These problems exist in any type of photoediting software environment ranging from photoediting software on a user's personal computer to photosharing software enabling multiple users to share and edit digital images. One such software environment is the QURIO® photosharing software, wherein a user may desire to order prints of various sizes of a single digital image and/or order numerous different products having the digital image or some portion thereof printed thereon. For example, the different products may each require different crop areas. More specifically, a mouse pad may have a square crop area while a mug may have a rectangular crop area. Similarly, each standard print size, such as 8 inches×10 inches, 5 inches×7 inches, and 4 inches×6 inches, has a different crop area. In order to allow the user to know exactly what portion of the digital image will appear on the product, the user must crop the digital image for each product, thereby creating multiple versions of the digital image and wasting valuable disk space. In addition, any additional photoediting tasks, such as red-eye reduction, must be performed on each of the multiple versions of the digital image.

Thus, there remains a need for a method of performing multiple crops on a digital picture without altering the digital picture such that only one image needs to be saved and any additional photoediting tasks need only to be performed on a single image.

SUMMARY OF THE INVENTION

The present invention provides a system and method allowing multiple crops to be defined for a single digital image without altering the digital image. Rather than actually cropping the digital image where a portion of the digital image is lost, the present invention generates and stores cropping information defining a desired area of the digital image for each of the crops. The cropping information is stored in metadata associated with the digital image or in an associated application file. More specifically, to define each of the multiple crops, a desired area of the digital image is first identified either automatically or by the user. The desired area may have various shapes and sizes. Once the desired area is identified, cropping information defining the desired area is stored. When it is desired to perform an operation such as printing the digital image, ordering a product having the digital image printed thereon, emailing the digital image, or the like, one of the desired areas is selected and the corresponding cropping information is used to crop the digital image to effectively remove the portion of the digital image outside of the desired area. The resulting cropped digital image is a temporary image that is sent to an intended recipient such as a printer, email recipient, or a company fulfilling orders for an ordered product.

By storing the cropping information rather than actually cropping the digital image, the present invention avoids the need to store a different digital image each time the digital image is cropped. In addition, any additional photoediting tasks need only be performed on a single digital image rather than on each cropped version of the digital image.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
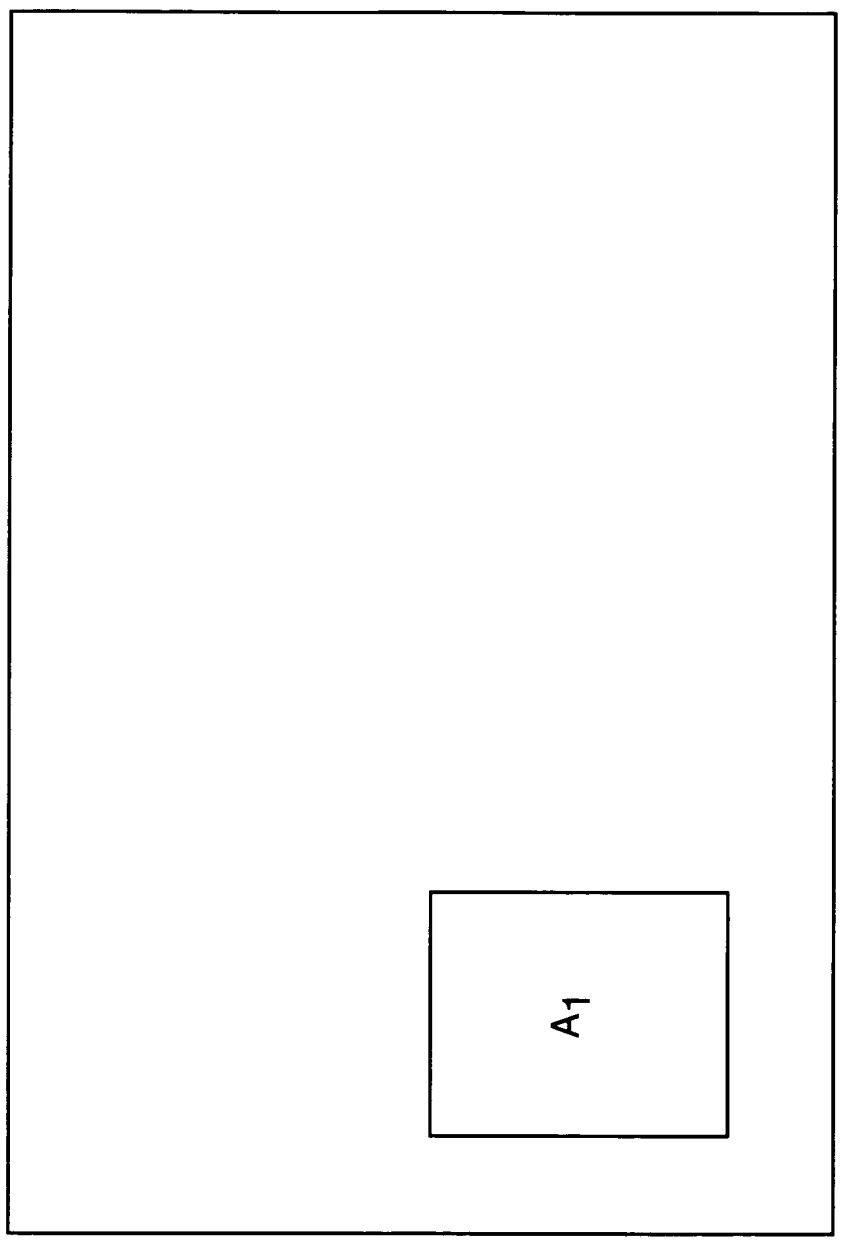
FIG. 1 illustrates an exemplary digital image including a first desired area corresponding to a first crop wherein cropping information defining the first desired area is stored according to the present invention.

The present invention provides a system and method for performing multiple crops on a single digital image without altering the image. Referring to FIG. 1, a user may identify a desired area ($A_1$) of a digital image 10. Rather than actually cropping the digital image 10 to produce a new digital image, cropping information defining the desired area ($A_1$) is generated and stored either in metadata associated with the digital image 10 or in an associated application file of photoediting software.

Metadata is used herein to refer to information within a digital image file that describes or otherwise relates to the digital image. Digital image formats such as Joint Photographic Experts Group (JPEG), Tagged Image File Format (TIFF), Graphical Interchange File Format (GIFF), Window Bitmap Graphics Format (BMP), and the like include metadata. For example, the JPEG format is based on tags or headers. The JPEG file is read as a stream of data. The data is parsed to identify desired tags. There are tags that define the start and end of the file, the beginning and end of the compressed image, the beginning and end of the compression table, and the beginning and end of various types of metadata. At least one of the tags is defined by the standard and used to define user specified metadata, and may be used to identify the location where the cropping information is stored within the file. However, the user specified metadata may include information other than the cropping information. Thus, there may be secondary tags within the user specified metadata indicating the beginning and end of the cropping information. If the digital image is opened by a software program that does not recognize the stored cropping information, the tag is simply ignored. Similar methods could be used for other file formats that support user specified data.

For formats that do not support user specified data, an application file is a file generated and maintained by a software program. The application file may include various types of information that is used by the software during operation. According to the present invention, the application file may also be used to store cropping information for numerous crops of one or more digital images.

Figure 2:
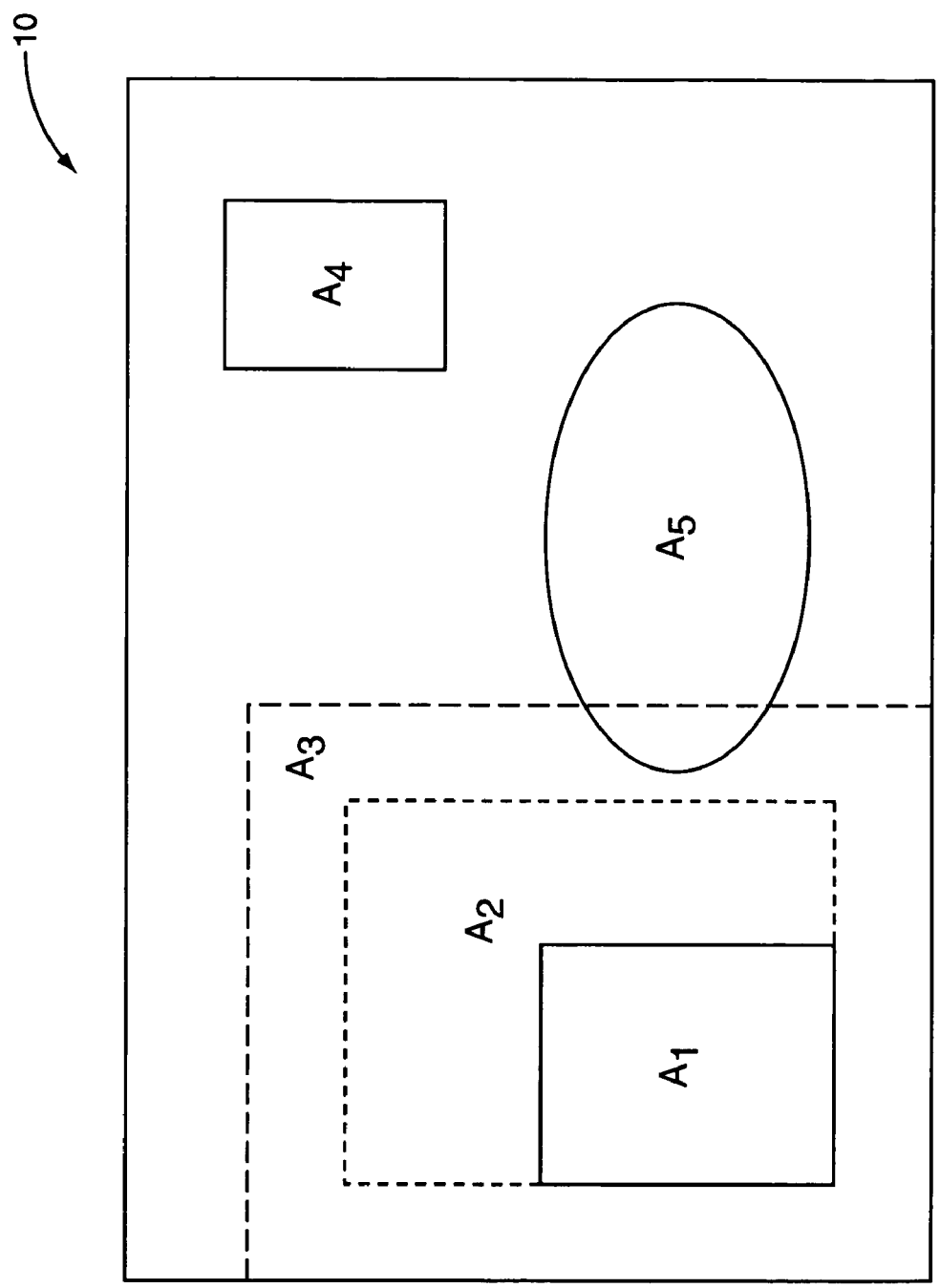
FIG. 2 illustrates the exemplary digital image of FIG. 1 including multiple desired areas corresponding to multiple crops wherein cropping information defining each of the desired areas is stored according to the present invention.

As illustrated in FIG. 2, a user may perform numerous crops on the digital image 10 by identifying any number of desired areas (A). As illustrated, there are five areas ($A_1$-$A_5$). Rather than actually cropping the digital image 10 to create new digital images for each of the desired areas ($A_1$-$A_5$), the desired areas ($A_1$-$A_5$) are identified, and the cropping information defining the desired areas ($A_1$-$A_5$) is generated and stored either in the metadata associated with the digital image 10 or in an application file associated with the photoediting software. Although FIG. 2 illustrates five desired areas ($A_1$-$A_5$), the present invention is not limited thereto. Cropping information may be generated and stored for any number of desired areas ($A_r$). As illustrated, the desired areas ($A_1$-$A_5$) may or may not overlap one another.

Each of the desired areas ($A_1$-$A_5$) may have any desired shape and size. For example, the shapes of the desired areas ($A_1$-$A_4$) may be standard crop shapes having length to width ratios corresponding to the length to width ratios of standard pictures sizes such as, but not limited to, 8×10, 5×7, and 4×6. As another example, the desired areas ($A_1$-$A_4$) may have each have a length to width ratio of an 8×10 standard picture size, but have different sizes, cover different areas of the digital image 10, and have unique photoedits applied thereto. Size affects the file size of a temporary cropped image generated based on the cropping information to be sent to an intended recipient such as a printer, an email recipient, or a company responsible for producing a desired product. The size may be defined in terms of pixels per inch, dots per inch (DPI), where "dots" refers to pixels, a digital zoom level, or a relative size with respect to the original digital image.

Once the cropping information defining the desired areas ($A_1$-$A_4$) is stored, the user may wish to perform an operation such as print the digital image 10, email the digital image 10, order a product with the digital image 10 printed thereon, fax the digital image 10, send the digital image 10 to a digital picture frame, or send the digital image 10 to a mobile phone. For this example, the user desires to print or order one or more 8×10 photographs of the desired area ($A_1$) of the digital image 10. When the user prints or orders the prints of the desired area ($A_1$), a temporary cropped digital image may be generated based on the stored cropping information for the desired area ($A_1$) and provided to either the user's printer or a photo printing service provider. In a similar fashion, if the user desired to perform any other desired operation such as emailing the digital image 10, ordering a product with the digital image 10 printed thereon, faxing the digital image 10, sending the digital image 10 to a digital picture frame, or sending the digital image 10 to a mobile phone, a temporary image would be generated based on the cropping information for the desired area and used to perform the operation.

The shapes of the desired areas ($A_1$-$A_5$) may also be one of a number of predetermined crop shapes associated with a product such as a mug, mouse pad, poster, calendar, t-shirt, and the like, which may be ordered with a desired portion of the digital image 10 printed thereon. For example, the desired area ($A_4$) may have a predetermined crop shape for a product such as a mug. When the user desires to order the product, the cropping information for the desired area ($A_1$) may be retrieved to generate a temporary cropped digital image for the product. The temporary cropped digital image generated based on the cropping information may then be provided, or transmitted, to a service provider that produces the product having the desired area ($A_4$) of the digital image 10 printed thereon.

The shapes may also be any shape such as, but not limited to, a rectangle, square, circle, ellipse, star, diamond, and the like. This may be particularly beneficial in a software environment that provides a scrapbooking feature. For example, the software may allow the user to create an electronic scrapbook having pictures, captions, graphics, and the like. The electronic scrapbook may be ordered from a service provider or printed by the user. A desired area may be identified and corresponding cropping information stored for each digital image used in the scrapbook. The desired areas of the digital images may be any desired shape and size. For example, the desired area ($A_5$) is an ellipse and may be used in the scrapbook. When the scrapbook is viewed, the software may retrieve the cropping information defining the desired area ($A_5$) from either metadata associated with the digital image 10 or from an application file associated with the software, and may automatically display the desired area ($A_5$) of the digital image 10. When the scrapbook is ordered or printed, the digital image 10 may be cropped based on the stored cropping information for the desired area ($A_5$) to provide a temporary cropped digital image that is provided to an intended recipient such as the user's printer or a service provider.

For each of the desired areas ($A_1$-$A_5$), cropping information is stored and may include an area definition defining the desired area. As will be apparent to one of ordinary skill in the art, the area definition may take many forms and may vary depending on the particular implementation. However, as an example, the area definition may define the border of the desired area. Alternatively, a shape, size, and reference point may be used to define the desired area. For a rectangular shape, the area definition may include a reference point such as a center point or a corner point, a length, and a width. For a circular shape, the area definition may include a center point and a radius.

The cropping information for each desired area may optionally include additional information defining photoedits that are to be applied only to the desired area. For example, for the desired area ($A_1$), the cropping information may include an area definition defining the desired area ($A_1$) and may optionally include information defining edits made only to the desired area ($A_1$). These additional edits may include adjustments to gamma brightness, sharpness, or contrast, or the like, as well as provide special effects. Rather than actually altering the image, information defining the desired photoedits may be stored in the metadata or in an associated application file.

Figure 3:
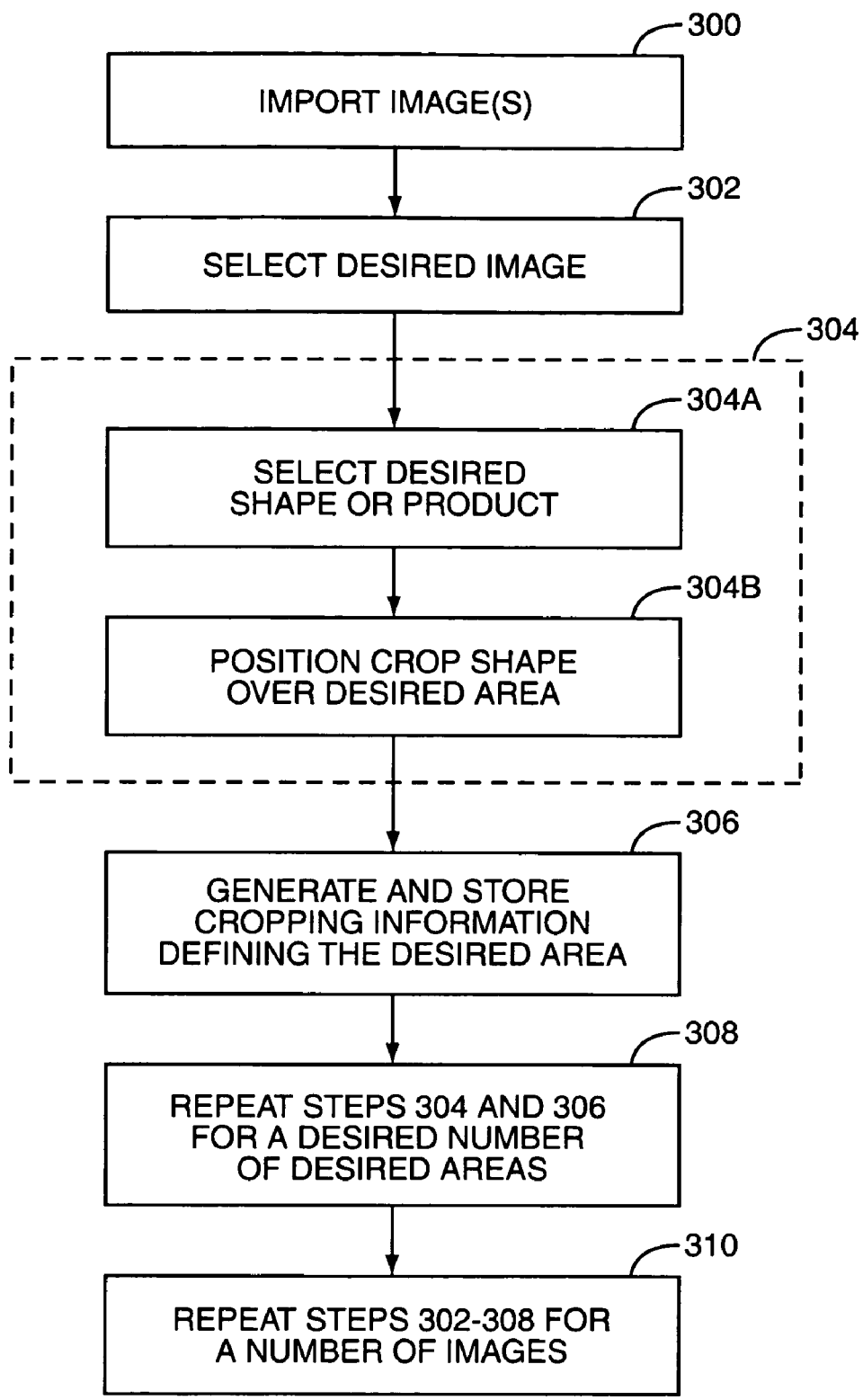
FIG. 3 illustrates an exemplary method for performing multiple crops on a digital image according to one embodiment of the present invention.

FIG. 3 illustrates an exemplary method for performing multiple crops on a single digital image according to one embodiment of the present invention. First, one or more digital images may be imported into a software environment (step 300). Then, a desired digital image may be selected (step 302). Steps 300 and 302 may alternatively be performed by simply opening a desired digital image file. Once the digital image is selected, a desired area of the digital image is identified (step 304), and cropping information defining the desired area is generated and stored (step 306).

As an example, the desired area of the digital image may be identified by selecting a desired crop shape or product on which the image will be placed (step 304A). The user may select an 8×10 ratio crop, a 5×7 ratio crop, a 4×6 ratio crop, a circular crop, a rectangular crop, or the like. If a desired product is selected, the crop shape may be predetermined. After selecting the desired crop shape or product, the user may then position the crop shape over the desired area of the digital image (step 304B). Positioning the crop may include resizing the crop shape. If the digital image is a photograph of a group of people, the user may place the crop shape over a desired person in the group of people and resize the crop shape to select only the face of the desired person. Note however, resizing the crop shape does not change the shape of the crop. If the crop shape is a rectangle having a length to width ratio of a standard 8×10 picture, resizing the crop shape changes the desired area inside the crop but does not change the length to width ratio. Positioning the crop may also include rotating the crop shape. If the crop shape is a rectangle having a length to width ratio of a standard 8×10 picture, the crop shape may be rotated to have either an 8×10 length to width ratio or a 10×8 length to width ratio. It should also be noted that steps 304A and 304B may alternatively be performed by allowing the user to create a free-form crop shape. The free-form crop shape is any shape that is uniquely created by the user. The user may create the crop shape over the desired area of the digital image. Alternatively, the user may create the free-form shape and then be allowed to resize the shape, resize the shape, and the like.

Once the desired area is identified (step 304), cropping information defining the desired area of the digital image is stored (step 306). A name or other identifier for the desired area may be generated automatically by the software or entered by the user. For example, the software may automatically generate "8×10" as the identifier for the cropping information. Alternatively, the user may enter the identifier "Tom's Face–8×10". The identifier may be used by the user or by the software in order to locate cropping information for a desired crop. Steps 304 and 306 may optionally be repeated to identify any number of desired areas of the digital image and to generate and store corresponding cropping information (step 308). Thereafter, steps 302-308 may optionally be repeated for any number of digital images (step 310).

Figure 4:
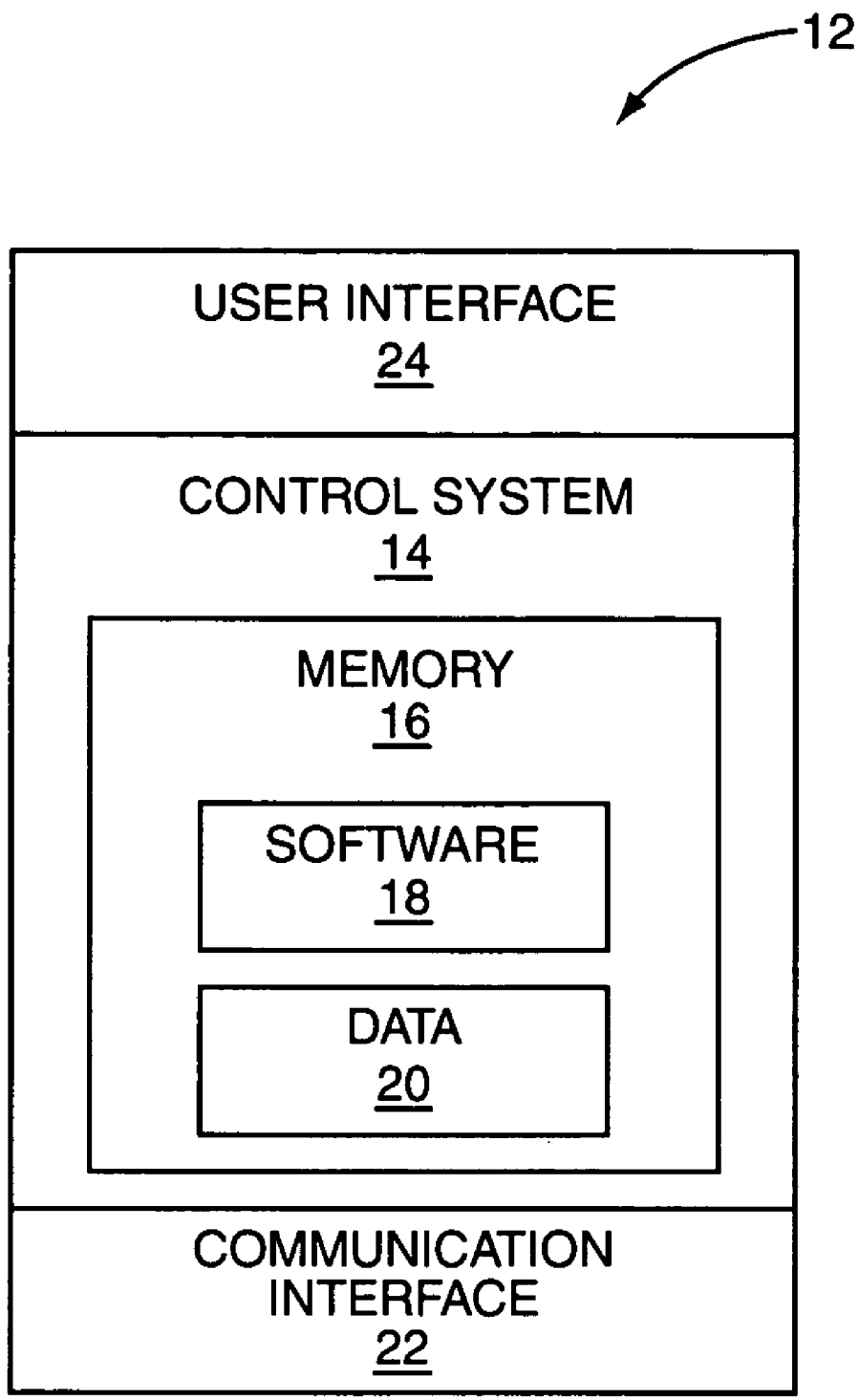
FIG. 4 illustrates an exemplary system running software that instructs the system to perform multiple crops on a digital image according to the present invention.

The present invention may be incorporated into software residing on a system 12 such as that illustrated in FIG. 4. The system 12 may be a central server, a user's computer, a node in a peer-to-peer network, a photo printing kiosk, or the like. The system 12 will generally include a control system 14 having associated memory 16. The memory 16 may store software 18, such as photoediting software, that generates and stores cropping information for any number of desired areas of a digital image according to the present invention. The memory 16 may also store data 20, such as a digital image file comprising a digital image, or a compressed version thereof, and metadata and/or an application file associated with the software 18. The system 12 may also include a communication interface 22 for communicating with other network entities. The communication interface 22 may include an interface to various external devices such as a printer. A user interface 24 may also be provided and include a keypad and a mouse (not shown).

Although FIG. 4 illustrates the software 18 within the memory of the computer system 12, the software 18 may be stored on any computer readable medium such as, but not limited to, a storage device of a central server, a storage device of a user's computer, an optical disk such as a compact disc (CD) or a Digital Video Disc (DVD), or the like. In addition, the software 18 may reside on a central server and be downloaded to and installed on a computer for any number of users.

Those skilled in the art will recognize improvements and modifications to the preferred embodiments of the present invention. All such improvements and modifications are considered within the scope of the concepts disclosed herein and the claims that follow.

What is claimed is:

1. A method of operating a computer to define multiple crops for a digital image comprising:
   identifying, at the computer, a plurality of desired areas of the digital image, the plurality of desired areas of the digital image defining a plurality of cropped versions of the digital image wherein each one of the plurality of desired areas of the digital image defines a corresponding one of the plurality of cropped versions of the digital image;
   generating cropping information at the computer defining the plurality of desired areas; and
   storing the cropping information in association with the digital image in digital storage associated with the computer such that the cropping information defining each of the plurality of desired areas is concurrently available.

2. The method of claim 1 wherein the digital image is not altered by identifying the plurality of desired areas, generating the cropping information, and storing the cropping information.

3. The method of claim 1 wherein storing the cropping information comprises storing the cropping information as metadata within an image file comprising the digital image.

4. The method of claim 1 wherein storing the cropping information comprises storing the cropping information in an application file associated with the digital image.

5. The method of claim 1 further comprising:
  selecting one of the plurality of desired areas; and
  cropping the digital image based on the cropping information for the one of the plurality of desired areas to provide a cropped image.

6. The method of claim 5 further comprising performing a desired operation using the cropped image.

7. The method of claim 6 wherein the desired operation is selected from a group consisting of: printing the cropped image, emailing the cropped image, ordering a desired product having the cropped image printed thereon, faxing the cropped image, sending the cropped image to a digital picture frame, and sending the cropped image to a mobile phone.

8. The method of claim 1 wherein a first of the plurality of desired areas has a shape different than a shape of a second of the plurality of desired areas.

9. The method of claim 1 wherein a first of the plurality of desired areas has a size different than a size of a second of the plurality of desired areas.

10. The method of claim 1 wherein a first of the plurality of desired areas covers a different area of the digital image than a second of the plurality of desired areas.

11. The method of claim 1 wherein identifying the plurality of desired areas comprises identifying a first desired area of the digital image to be printed on a desired product, and the method further comprises:
  cropping the digital image based on the cropping information defining the first desired area to provide a cropped image; and
  providing the cropped image to a supplier providing the desired product such that the first desired area of the digital image is printed on the desired product.

12. The method of claim 1 wherein identifying the plurality of desired areas comprises identifying a first desired area for a standard picture format, and the method further comprises:
  requesting a print of the digital image having the standard picture format;
  cropping the digital image based on the cropping information defining the first desired area to provide a cropped image; and
  providing the cropped image such that the print contains the first desired area of the digital image.

13. The method of claim 1 wherein identifying the plurality of desired areas of the digital image comprises, for each of the plurality of desired areas:
  selecting a desired crop shape; and
  positioning the desired crop shape over one of the plurality of desired areas of the digital image.

14. The method of claim 13 wherein positioning the desired crop shape comprises resizing the desired crop shape.

15. The method of claim 13 wherein selecting the desired crop shape comprises selecting a desired standard picture size, wherein the desired crop shape corresponds to a length to width ratio of the desired standard picture size.

16. The method of claim 13 wherein selecting the desired crop shape comprises selecting one of a plurality of predetermined crop shapes.

17. The method of claim 13 wherein selecting the desired crop shape comprises selecting a desired product, wherein a predetermined crop shape is associated with the desired product.

18. The method of claim 1 wherein for each one of the plurality of desired areas, the cropping information comprises an area definition defining the one of the plurality of desired areas.

19. A computer readable medium implemented as an article of manufacture and storing software adapted to instruct a system to:
  identify a plurality of desired areas of a digital image, the plurality of desired areas of the digital image defining a plurality of cropped versions of the digital image wherein each one of the plurality of desired areas of the digital image defines a corresponding one of the plurality of cropped versions of the digital image;
  generate cropping information defining the plurality of desired areas; and
  store the cropping information in association with the digital image such that the cropping information defining each of the plurality of desired areas is concurrently available.

20. A system for defining multiple crops for a digital image comprising:
  a storage device; and
  a control system implemented in hardware and adapted to:
    identify a plurality of desired areas of the digital image, the plurality of desired areas of the digital image defining a plurality of cropped versions of the digital image wherein each one of the plurality of desired areas of the digital image defines a corresponding one of the plurality of cropped versions of the digital image;
    generate cropping information defining the plurality of desired areas; and
    store the cropping information in the storage device in association with the digital image such that the cropping information defining each of the plurality of desired areas is concurrently stored and available.

* * * * *